(12) United States Patent
Ruan (10) Patent No.: US 12,028,137 B2
(45) Date of Patent: Jul. 2, 2024

(54) SYSTEMS AND METHODS TO EXTRACT BEAMFORMING PARAMETERS AT A RADIO UNIT (RU) OF A RADIO ACCESS NETWORK (RAN)

(71) Applicant: XILINX, INC., San Jose, CA (US)

(72) Inventor: Ming Ruan, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/890,134

(22) Filed: Aug. 17, 2022

(65) Prior Publication Data
US 2024/0063861 A1 Feb. 22, 2024

(51) Int. Cl.
*H04B 7/06* (2006.01)

(52) U.S. Cl.
CPC ......... *H04B 7/0617* (2013.01); *H04B 7/0626* (2013.01); *H04B 7/0634* (2013.01)

(58) Field of Classification Search
CPC .................................................. H04B 7/0617
USPC .......................................................... 375/267
See application file for complete search history.

(56) References Cited

U.S. PATENT DOCUMENTS

2022/0376823 A1\* 11/2022 Vagner .................. H04L 5/0023

\* cited by examiner

*Primary Examiner* — Lihong Yu
(74) *Attorney, Agent, or Firm* — Patterson + Sheridan, LLP (57) ABSTRACT

Embodiments herein describe a radio unit (RU) of a radio access network (RAN), that extracts payload data and beamforming parameters from matrices received from a base station based on format parameters of the matrices and format parameters of channel state information resource signal resource elements (CSI-RS REs). The matrices include a payload matrix and first and second bit mask matrices. Locations of CSI-RS REs are determined based on the bit mask matrices. The payload matrix is separated into CSI-RS RE and non-CSI-RS RE payload matrices based on the locations of the CSI-RS REs. CSI-RS REs and the non-CSI-RS REs beamforming weight matrices are recovered from the bit mask matrices based on known features of the CSI-RS REs and the bit mask matrices. Digital downlink beamforming is performed based on the recovered payload matrices and beamforming weight matrices.

20 Claims, 10 Drawing Sheets

Original H Matrix 402

Original W Matrix 404

FIG. 5

P Matrix 502

| 508 | 1 | 2 | 3 | 4 | 5 | 6 | 7 | 8 | 9 | 10 | 11 | 12 |
|---|---|---|---|---|---|---|---|---|---|---|---|---|
| 1 | 0 | 1 | 0 | 1 | 0 | 0 | 0 | 0 | 0 | 0 | 0 | 0 |
| 2 | 0 | 0 | 0 | 0 | 0 | 0 | 0 | 0 | 0 | 0 | 0 | 0 |
| 3 | 0 | 0 | 0 | 0 | 0 | 0 | 0 | 1 | 0 | 1 | 0 | 0 |
| 4 | 0 | 0 | 0 | 0 | 1 | 1 | 0 | 0 | 0 | 0 | 1 | 1 |
| 5 | 0 | 0 | 0 | 0 | 0 | 0 | 0 | 0 | 0 | 0 | 0 | 0 |
| 6 | 0 | 0 | 0 | 0 | 0 | 1 | 0 | 1 | 0 | 0 | 1 | 1 |
| 7 | 0 | 0 | 0 | 0 | 0 | 0 | 0 | 0 | 0 | 1 | 0 | 0 |
| 8 | 0 | 0 | 0 | 0 | 0 | 0 | 0 | 0 | 0 | 0 | 0 | 0 |

(516, 518, 520, 522 bracket columns 1, 3, 5, 7)

Q Matrix 504

| 510 | 1 | 2 | 3 | 4 | 5 | 6 | 7 | 8 |
|---|---|---|---|---|---|---|---|---|
| 1 | 0 | 1 | 0 | 0 | 0 | 1 | 0 | 0 |
| 2 | 0 | 0 | 0 | 0 | 0 | 0 | 0 | 0 |
| 3 | 0 | 1 | 0 | 0 | 0 | 1 | 0 | 0 |
| 4 | 0 | 0 | 0 | 0 | 0 | 0 | 0 | 0 |
| 5 | 0 | 0 | 1 | 0 | 1 | 0 | 1 | 0 |
| 6 | 0 | 0 | 1 | 0 | 1 | 0 | 1 | 0 |
| 7 | 0 | 0 | 0 | 1 | 0 | 0 | 0 | 1 |
| 8 | 0 | 0 | 0 | 0 | 0 | 0 | 0 | 0 |
| 9 | 0 | 0 | 0 | 1 | 0 | 0 | 0 | 1 |
| 10 | 0 | 0 | 0 | 0 | 0 | 0 | 0 | 0 |
| 11 | 0 | 1 | 0 | 1 | 0 | 1 | 0 | 0 |
| 12 | 0 | 1 | 0 | 1 | 0 | 1 | 0 | 0 |

(512, 514, 524, 526, 528 bracket columns)

$\left.\begin{array}{l}1\ 0\ 0\ 0\ 1\ 0\ 0\ 0\ 0\ 0\ 0\ 0\\ 0\ 1\ 0\ 0\ 0\ 1\ 0\ 0\ 0\ 0\ 0\ 0\\ 0\ 0\ 1\ 0\ 0\ 0\ 1\ 0\ 0\ 0\ 0\ 0\\ ...\\ 0\ 0\ 0\ 0\ 0\ 0\ 0\ 0\ 0\ 0\ 1\ 1\end{array}\right\}$ Max number of layers for CSI-RS $\left.\begin{array}{l}0\ 0\ 0\ 0\ 0\ 0\ 0\ 0\ 1\ 0\ 0\\ 0\ 0\ 0\ 0\ 0\ 0\ 0\ 0\ 1\ 0\ 0\\ ...\\ 0\ 0\ 0\ 0\ 0\ 0\ 0\ 0\ 1\ 0\ 0\end{array}\right\}$ Additional layers for normal data only

SYSTEMS AND METHODS TO EXTRACT BEAMFORMING PARAMETERS AT A RADIO UNIT (RU) OF A RADIO ACCESS NETWORK (RAN)

TECHNICAL FIELD

Examples of the present disclosure generally relate to extract beamforming parameters in a radio access network (RAN).

BACKGROUND

A radio unit (RU) of a radio access network (RAN) performs beamforming operations to direct transmissions to user equipment based on beamforming parameters provided by a base station. RAN vendors are moving towards open interfaces to permit interoperability amongst RAN components of different vendors. Under existing open interface protocols, beamforming parameters are provided from base stations to RUs in formats that render RU beamforming operations computationally expensive and challenging to perform in vector processors.

SUMMARY

Techniques for extracting beamforming parameters from matrices received from a base station are described. One example is an apparatus that includes a radio unit having digital downlink beamforming circuitry configured to receive a payload matrix and first and second bit mask matrices from a base station, extract payload data for channel state reference signal resource elements (CSI-RS REs) and non-CSI-RS REs from the payload matrix based on format protocols of the bit mask matrices, extract CSI-RS REs and non-CSI-RS REs beamforming parameters from the first and second bit mask matrices based on the format protocols of the bit mask matrices and format protocols of the CSI-RS REs and the non-CSI-RS REs, and perform digital downlink beamforming based on the extracted payload data and the extracted beamforming parameters.

Another example described herein is a radio unit (RU) that includes baseband processing circuitry configured to generate a baseband signal based on data received from a base station, modulation circuitry configured to modulate carriers based on the digital baseband signal, radio frequency front end circuitry configured to frequency up-convert the modulated carriers, and an antenna subsystem configured to transmit the frequency up-converted modulated carriers, where the baseband processing circuitry includes digital downlink beamforming circuitry configured to receive a payload matrix and first and second bit mask matrices from the base station, extract payload data for channel state reference signal resource elements (CSI-RS REs) and non-CSI-RS REs from the payload matrix based on format protocols of the bit mask matrices, extract CSI-RS REs and non-CSI-RS REs beamforming parameters from the first and second bit mask matrices based on the format protocols of the bit mask matrices and format protocols of the CSI-RS REs and the non-CSI-RS REs, and perform digital downlink beamforming based on the extracted payload data and the extracted beamforming parameters.

Another example described herein is a method that includes, at a radio unit (RU) of a radio access network, receiving a payload matrix and first and second bit mask matrices from a base station, extracting payload data for channel state reference signal resource elements (CSI-RS REs) and non-CSI-RS REs from the payload matrix based on format protocols of the bit mask matrices, extracting CSI-RS REs and non-CSI-RS REs beamforming parameters from the first and second bit mask matrices based on the format protocols of the bit mask matrices and format protocols of the CSI-RS REs and the non-CSI-RS REs, and performing digital downlink beamforming based on the extracted payload data and the extracted beamforming parameters.

BRIEF DESCRIPTION OF DRAWINGS

So that the manner in which the above recited features can be understood in detail, amore particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 7 illustrates example matrices X, U, and V, where the X matrix is received at a RU from a base station, and where X=U+V, according to an embodiment.

To facilitate understanding, identical reference numerals have been used, where possible, to designate identical elements that are common to the figures. It is contemplated that elements of one example may be beneficially incorporated in other examples.

DETAILED DESCRIPTION

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe techniques to extract beamforming parameters at a radio unit (RU) of a radio access network (RAN) from data received from a RAN base station based on known structures or protocols of the parameters.

Techniques disclosed herein may be useful to reduce the amount of computations (e.g. by 50% in some examples), thus improving efficiency. Techniques disclosed herein may also enable efficient implementation on vector processors. Techniques disclosed herein may also facilitate channel state information resource signal (CSI-RS) beamforming weight compression, which may reduce storage requirements. Techniques disclosed herein may be useful in an open-RAN (O-RAN) environment. The techniques disclosed herein may also utilize one or more variables (e.g., parameters, ranges, and/or thresholds) that are easily tailored for different standards, specifications, or protocols (e.g., open RAN or O-RAN specifications). The variables may be modified as standards, specifications, protocols, and/or practices evolve.

Figure 1:
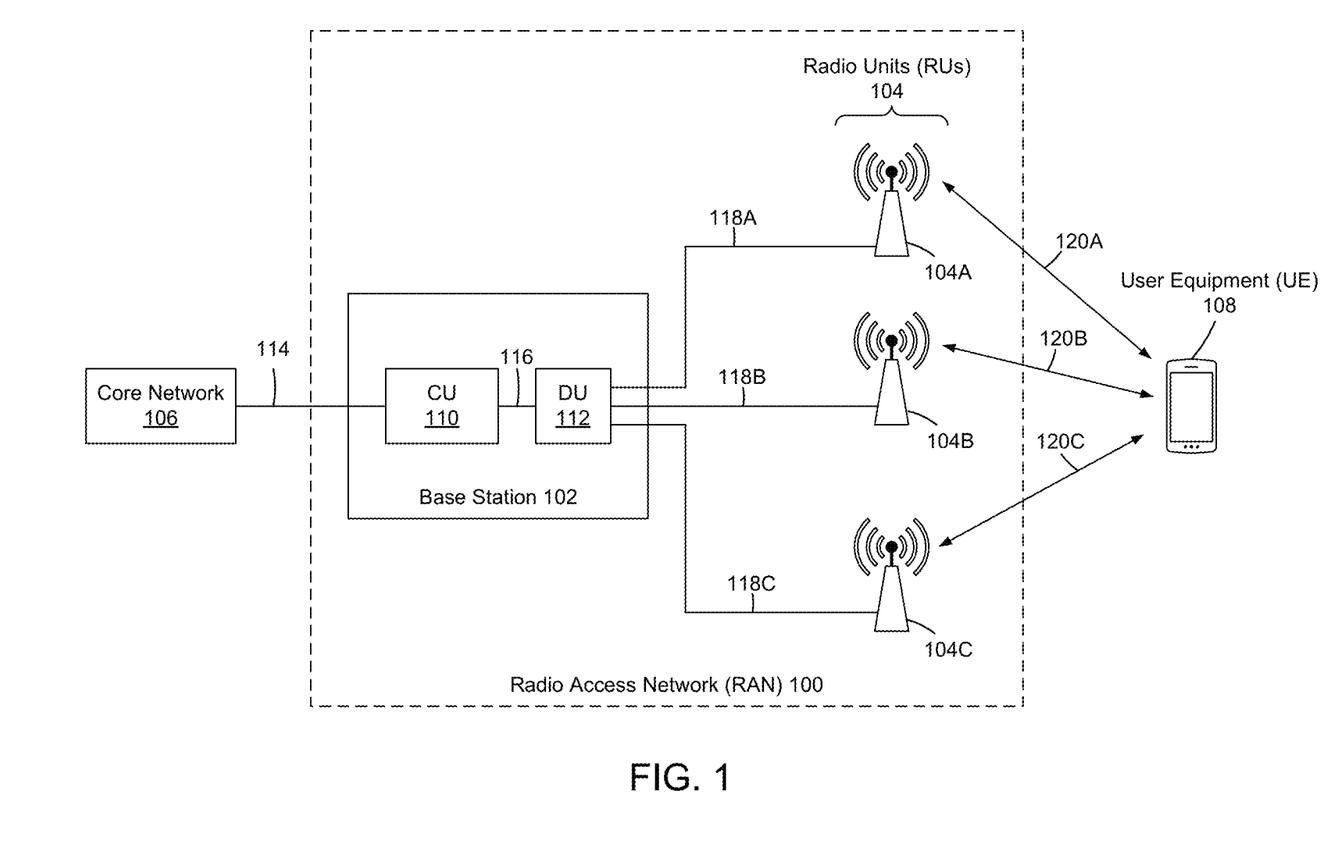
FIG. 1 is a block diagram of radio access network (RAN) that includes a base station and a radio unit (RU), according to an embodiment.

FIG. 1 is a block diagram of radio access network (RAN) 100, according to an embodiment. The RAN 100 may be part of a mobile telecommunication system. The RAN 100 includes a base station 102 and one or more radio units (RUs) 104, illustrated here as RUs 104A, 104B, and 104C, that provide wireless communications between a core network 106 and one or more remote devices, illustrated here as user equipment (UE) 108.

In the example of FIG. 1, base station 102 includes a centralized unit (CU) 110 and a distributed unit (DU) 112. CU 110 may be located at a data center. DU 112 may be co-located with CU 110, or may be located elsewhere, such as at a cell site (e.g., co-located with one of RUs 104).

DU 112 may perform higher physical layer functions, while RUs 104 may host lower physical layer functions.

Core network 106 and CU 110 communicate with one another over a backhaul link 114. CU 110 and DU 112 communicate with one another over a midhaul link 116. DU 112 communicates with RUs 104 over respective fronthaul links 118A, 118B, and 118C. RUs 104 communicate with UE 108 over respective wireless channels or paths 120A, 120B, and 120C.

The term downlink is used herein to refer to communications from RAN 100 to UE 108. The term uplink is used herein to refer to communications from UE 108 to RAN 100.

Base station 102 and RUs 104, or a portion thereof, may be configured in accordance with a standard or specification, such as 3GPP TS 38.211, version 16.8.0, release 16, titled "5G; NR; Physical Channels and Modulation," developed by the 3$^{rd}$ Generation Partnership Project (3GPP). Base station 102 and RUs 104 are not, however, limited to the foregoing example.

Base station 102 (i.e., CU 110 and/or DU 112) and RUs 104 may be designed, manufactured, or sourced from different vendors. Base station 102 and RUs 104 may communicate with one another over fronthaul links 118 based on a protocol or standard designed to permit base station 102 and RUs 104 of different vendors to work together.

Figure 2:
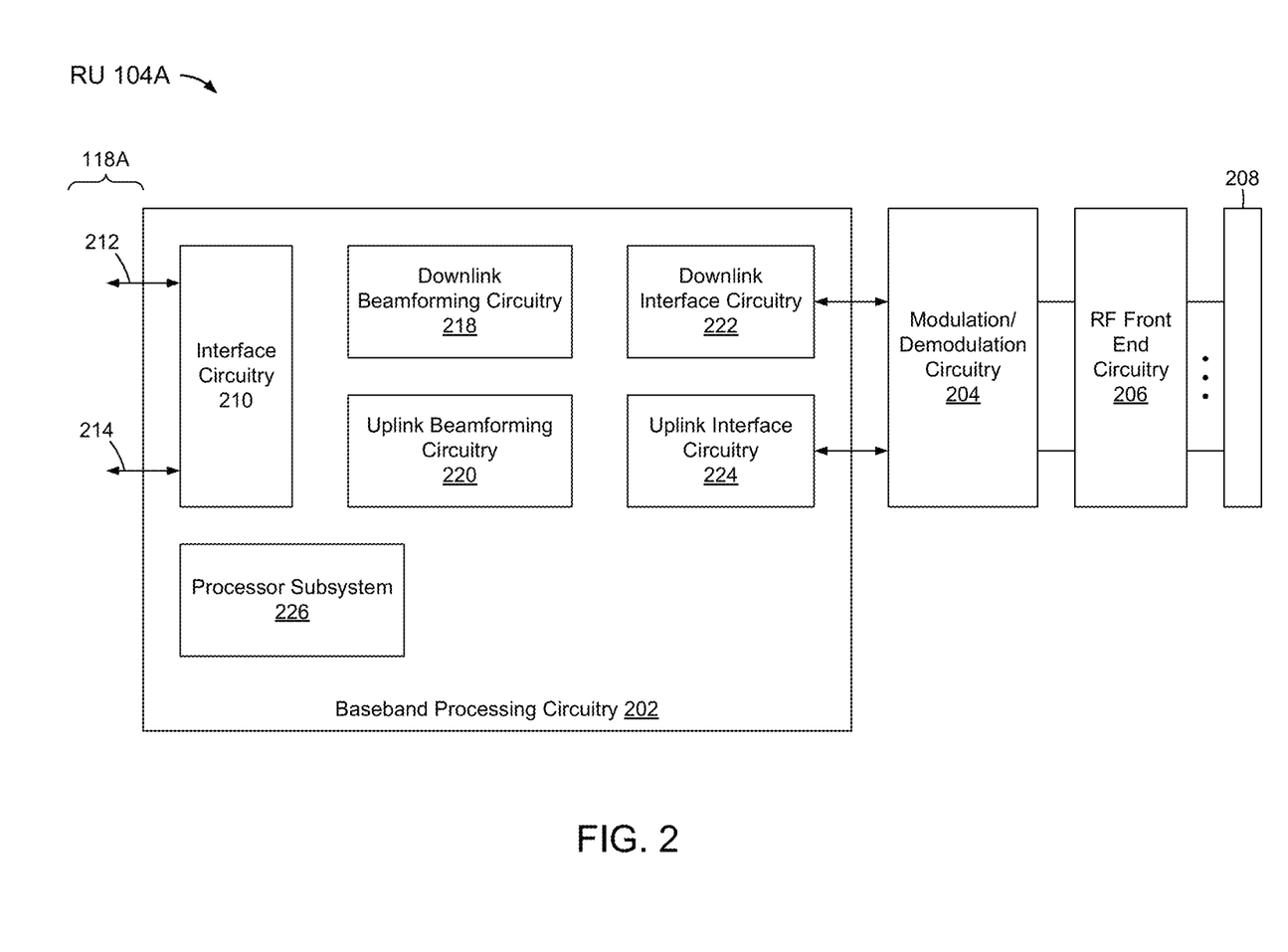
FIG. 2 is a block diagram of the RU, according to an embodiment.

FIG. 2 is a block diagram of RU 104A, according to an embodiment. RU 104B and/or RU 104C may be similar or identical to RU 104A.

In FIG. 2, RU 104A includes baseband processor circuitry 202, modulation/demodulation circuitry 204, RF frontend circuitry 206, and an antenna subsystem 208.

Baseband processor circuitry 202 includes interface circuitry 210 that interfaces with DU 112 over fronthaul link 118A. In this example, fronthaul link 118A includes a downlink path 212 and an uplink path 214. Downlink path 212 and uplink path 214 may include packet-switched connections (e.g., Ethernet). In an embodiment, DU 112 provides payload data and control signals to RU 104A over downlink path 212, including downlink beamforming control signals. Examples are provided further below.

Baseband processor circuitry 202 further includes downlink beamforming circuitry 218 and uplink beamforming circuitry 220.

Downlink beamforming circuitry 218 performs downlink beamforming in order to direct downlink wireless transmissions from RU 104A to UE 108 (i.e., over path 120A). The downlink beamforming may optimize the downlink wireless transmissions and/or reduce interference that might otherwise be imparted to other UEs. Downlink beamforming circuitry 218 may perform digital downlink beamforming in the frequency domain before an IFFT.

Downlink beamforming circuitry 218 may perform digital beamforming based on downlink beamforming data and controls provided by DU 112 over downlink path 212. Examples are provided further below.

Downlink beamforming circuitry 218 may include configurable/programmable circuitry (e.g., a field-programmable logic array) and/or an instruction processor. Downlink beamforming circuitry 218 may include vector processors that perform digital downlink beamforming in a vectorized format.

Baseband processor circuitry 202 further includes downlink interface circuitry 222 and uplink interface circuitry 224 that communicate with modulation/demodulation circuitry 204. Downlink interface circuitry 222 and uplink interface circuitry 224 may include serial interface circuitry.

Baseband processor circuitry 202 may further include a processor subsystem 226. Processor subsystem 226 may include a management plane (m-plane) for handling management control data and/or a synchronization plane (S-plane) for handling synchronization (e.g., frequency and/or time synchronization).

Baseband processor circuitry 202 may include one or more additional features.

In an embodiment, modulation/demodulation circuitry 204 modulates and demodulates orthogonal frequency-division multiplexing (OFDM) carriers. An OFDM scheme may utilize resource elements (REs), examples of which are described further below with reference to FIG. 3.

RF frontend circuitry 206 may include low noise amplifiers, power amplifiers, filters, combiners/dividers, and/or synthesizers.

Antenna subsystem 208 may include physical antennae, an RF signal distribution/aggregation network, and phase shifters. The physical antennae may include an active antenna array.

Figure 3:
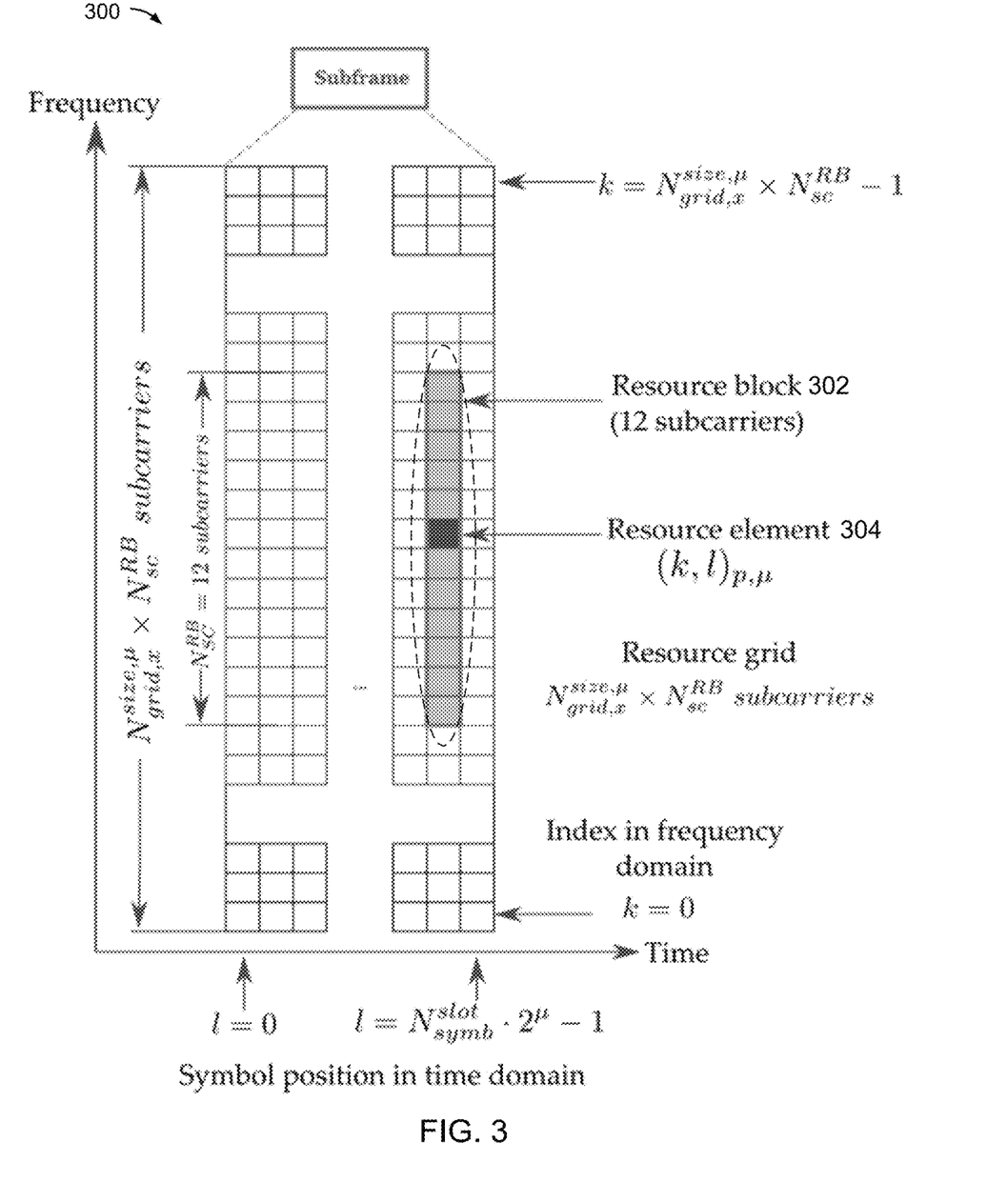
FIG. 3 illustrates a subframe of a resource grid, according to an embodiment.

FIG. 3 illustrates a subframe 300 of a resource grid, according to an embodiment. The resource grid may be formatted in accordance with a 5G New Radio (NR) specification, such as specification 3GPP TS 38.211, introduced above.

Subframe 300 includes a resource block (RB) 302. RB 302 includes 12 resource elements (REs) 304. Each RE 304 may correspond to one subcarrier in the frequency domain and one OFDM symbol in the time domain. The 12 REs 304 may represent 12 consecutive subcarriers in the frequency domain.

A RB may be the smallest unit of resources that may be allocated to a user. A RE may be the smallest unit of a resource grid.

In an embodiment, base station 102 provides payload data to RUs 104 as baseband REs, and RUs 104 modulate OFDM subcarriers with the baseband REs. Base station 102 may utilize a subset of the REs for control signals, such as channel state information reference signals. REs containing channel state information reference signals are referred to CSI-RS REs.

REs are addressed in the specification 3GPP TS 38.211, version 16.8.0, release 16, at section 4.4.3. CSI-RSs are addressed in the specification 3GPP TS 38.211, version 16.8.0, release 16, at section 7.4.1.5.

Downlink beamforming is described below.

Base station 102 provides channel state information (CSI) related to communication paths or channels 120 to RUs 104. RUs 104 pre-code transmissions to UE 108 based the CSI to enhance signal-to-noise ratio (SNR) of the respective transmissions.

Base station 102 may provide CSI as beam forming parameters (e.g., weights) to RUs 104 within CSI-RS REs. Non-CSI-RS REs within a RB may share the same beamforming weights. CSI-RS REs within the RB may be processed with a different set of weights. Different manufacturers of base station components may utilize differing sets of REs as CSI-RS REs, and may not report which REs are used as CSI-RS REs to RUs 104.

Downlink beamforming may be represented as a matrix multiplication, such as illustrated in Equation 1.

$$Y=\{H,W\}\cdot\{U;V\} \qquad \text{EQ. (1)}$$

where:
{,} represents matrix horizontal concatenation;
{;} represents matrix vertical concatenation;
H is a beamforming weight for normal REs;
W is a beamforming weight for CSI-RS REs;
U and V contain payload data for normal and CSI-RS REs; and
Y is a signal to be transmitted via antenna subsystem 208 to UE 108.

In other words, H is a matrix to be multiplied by U. W is a weight to be multiplied by V. U and V are vertically concatenated. H and W are weights for non-CSI-RS REs, which is U. Portions of the H matrix may intentionally be set to zero to avoid multiplying with V.

In an embodiment, base station 102 sends two sets of weights to RU 104A, and uses bit masks to indicate which weight to use. Base station 102 may, for example, provide H, W, U, and V to RU 104A in the form of an matrix, X (where X=U+V), a beamforming weight matrix A with a bit-mask P to be applied to X before multiplication, and a beamforming weight matrix B with a bit-mask Q to be applied to matrix X before multiplication. P is a filter to recover U. If P indicates non-zero elements in U, then using X (dot) multiplied with P basically recovers U. Another beam forming weight matrix B and a bit mask Q may be (dot) multiplied with X to recover V. U and V may correlate to H and W. Stated another way, bit mask P may contain shuffled weights A, and bit mask Q may contain shuffled weights B.

The selection of weights may have a granularity of every RE and layer. It may be difficult to vectorize beamforming computations in such a situation (i.e., difficult to perform beam forming in a vector processor).

Further regarding the X matrix, U and V are not concatenated (i.e., not [U; V]). Rather, U and V are added as (U+V). Generally, for a given row/column, entries of U and V may both be zero, or one may be non-zero, but both will not non-zero. Thus, U and V may be added without loss of information. U and V tend to be sparse (many zeros). Sending U and V to RU 104A as a single matrix X may utilize bandwidth of fronthaul link 118A.

For the examples above, RU 104A may perform beamforming by multiplying P by X, and then multiplying by A, and by multiplying Q and X, and then B. Such a beamforming process works, but because there are so many zeros, A and B are processed similarly. Thus, although many of the entries may be zero, the entries are treated as non-zero and multiplied as normal. Performing the multiplication for every matrix is computationally expensive.

The foregoing may be a relatively efficient way to transport beamforming parameters to RUs 104. However, weight matrix A is not necessarily identical to matrix H, and weight matrix B is not necessarily identical to matrix W. Rather, weights of matrices A and B may be shuffled.

Also, bit masks P and Q may be shuffled (e.g., a first row of H may belong to a first row of Q, and a first row of W may belong to first row of P). As a result, RU 104A may not be able to directly apply H and W (i.e., cannot efficiently recover the previous matrix multiplication structure).

It may be challenging to determine which rows are exchanged between H and W matrices and which REs are CSI-RS REs just by looking at the bit masks (i.e., P and Q matrices). In some situations, the H matrix is sparse, which makes it even more challenging. Absent knowledge of which REs are used as CSI-RS REs, downlink beamforming circuitry 218 may perform beamforming as illustrated below.

```
For RE_Idx = 1:12
   For Ant_Idx = 1:M
      Y[Ant_Idx, RE_Idx]=0
      For Lay_Idx=1:N
         Y[Ant_Idx, RE_Idx] +=
            A[Ant_Idx,Lay_Idx](P[Lay_Idx, RE_Idx] ♦
            X[Lay_Idx, RE_Idx])
            + B[Ant_Idx,Lay_Idx](Q[Lay_Idx, RE_Idx] ♦
            X[Lay_Idx, RE_Idx])
      End
   End
End
```

The foregoing computations may expend unnecessary computational resources because half of the entries in X may be forced to zero by the bit masks before the multiplication with A and B. The foregoing computations are also difficult to vectorize because the dot multiply is applied to every entry of the matrix.

An alternative approach is provided below.

In many situations, H is more dense than W (W is spare). For example, in some situations, as few as 5 percent of REs have a W that is not all zero. Most W are all zero. In such situations, H and W may be recovered from P and Q. For example, in many situations, a single multiply will suffice, rather than two. In other words, since W is sparse, multiplications are not necessary for zero elements.

Disclosed herein are techniques to identify CSI-RS REs based on the bit masks, and to extract U and V matrices from the X matrix based on the identification of the CSI-RS REs. The techniques are disclosed below with reference to FIGS. 4-7.

Figure 4:
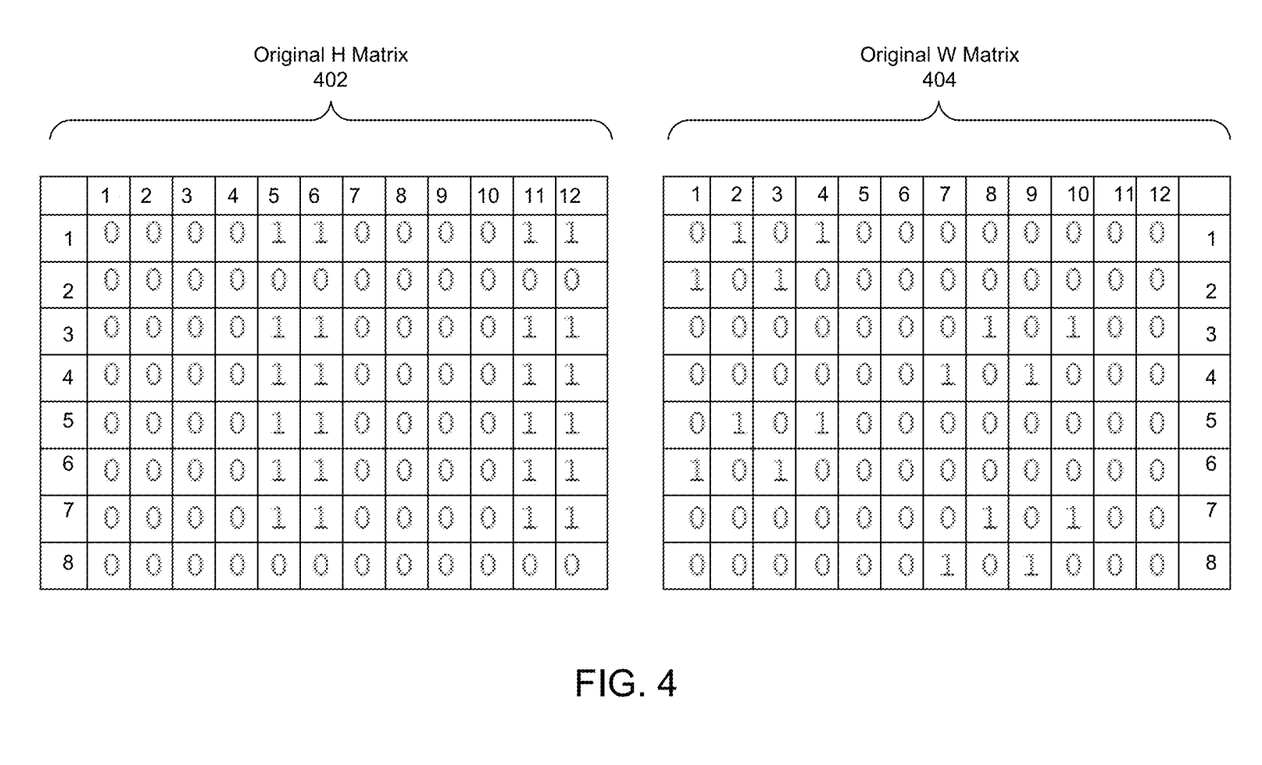
FIG. 4 illustrates example original H and W matrices, according to an embodiment.

FIG. 4 illustrates example H and W matrices 402 and 404, respectively, according to an embodiment. H and W matrices 402 and 404 may be referred to herein as original H and W matrices.

Figure 5:
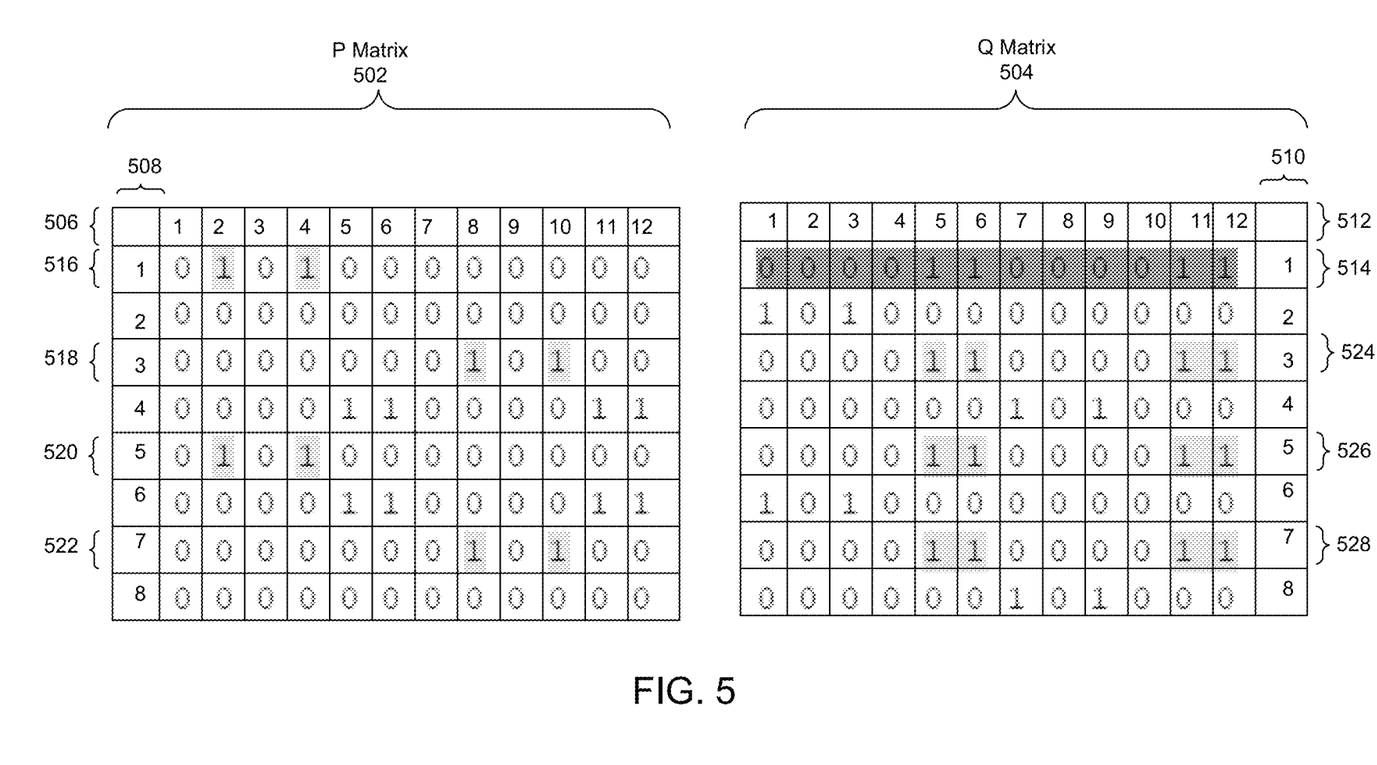
FIG. 5 illustrates example bit-masks, illustrated here as P and Q matrices, according to an embodiment.

FIG. 5 illustrates example P and Q matrices 502 and 504, respectively, according to an embodiment. P and Q matrices 502 and 504 may also be referred to herein as bit-masks P and Q. Entries of P matrix 502 may be identified by row indices 506 and column indices 508. Entries of Q matrix 504 may be identified by row indices 510 and column indices 512.

Figure 6:
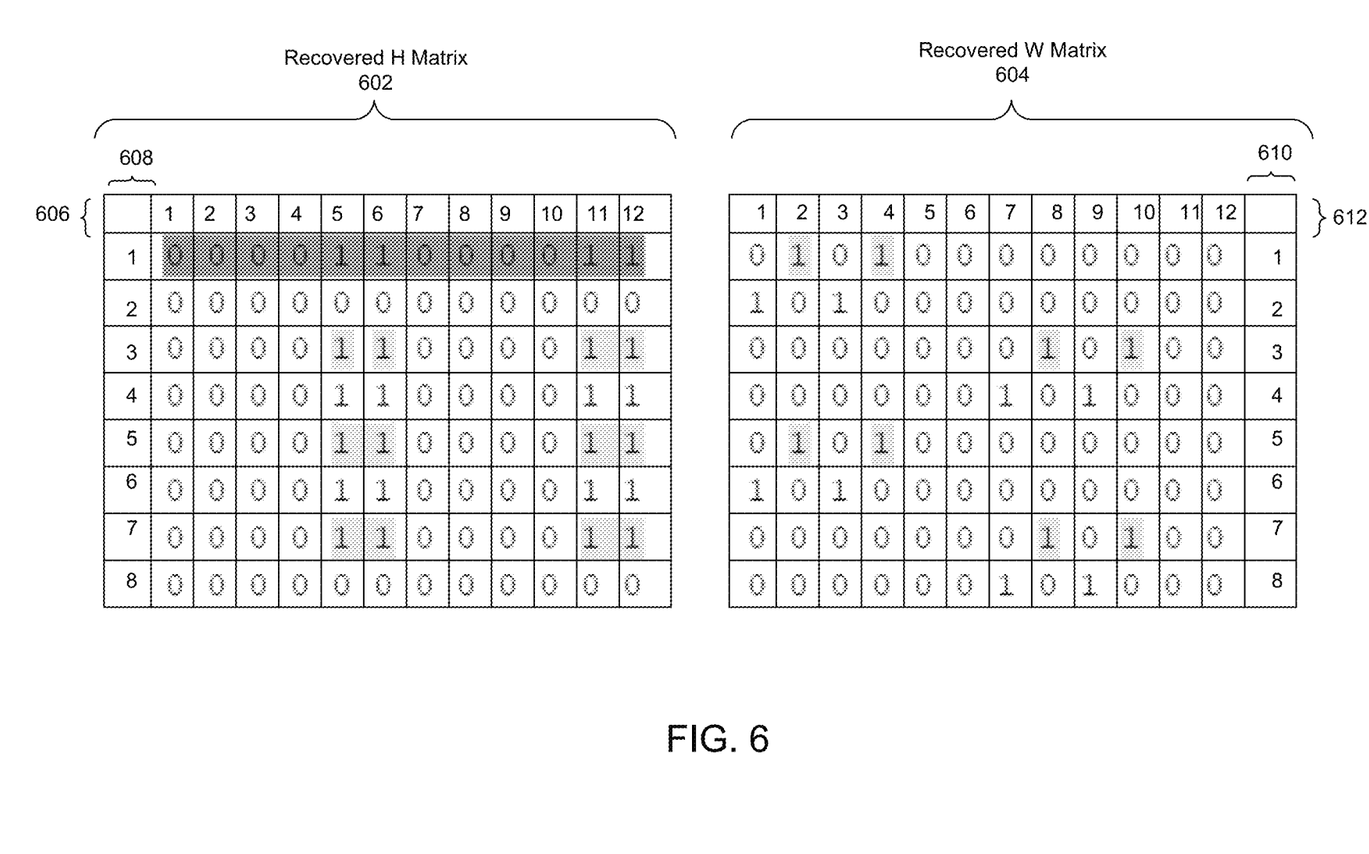
FIG. 6 illustrates example recovered H and W matrices, according to an embodiment.

FIG. 6 illustrates example recovered H and W matrices 602 and 604, respectively, according to an embodiment. Entries of H matrix 602 may be identified by row indices 606 and column indices 608. Entries of W matrix 604 may be identified by row indices 610 and column indices 612.

FIG. 7 illustrates example X, U, and V matrices 702, 704, and 706, respectively, according to an embodiment.

Table 1 below lists alternative names for matrices introduced above.

TABLE 1

| | |
|---|---|
| X Matrix 702 | Payload Matrix |
| P Matrix 502 | First Bit Mask Matrix |
| Q Matrix 504 | Second Bit Mask Matrix |
| U Matrix 704 | non-CSI-RS RE Payload Matrix |
| V Matrix 706 | CSI-RS RE Payload Matrix |
| H Matrix 602 | non-CSI-RS RE Beamforming Weight Matrix |
| W Matrix 604 | CSI-RS Beamforming Weight RE Matrix |

In examples herein, a matrix entry of "1" indicates a non-zero value, which may be a complex number.

Techniques disclosed below leverage properties or protocols of CSI-RS REs and non-CSI-RS REs and of the matrices. The properties or protocols may be based on standard or specification. Example properties are listed below.

In an embodiment:
- a RB contains up to 8 CSI-RS REs;
- in P and Q matrices, a row corresponding to an active layer contains at least 12−8=4 non-zero values, and zeros in the row indicate locations of CSI-RS;
- in the H matrix, a row in which all entries are zero (i.e., no non-zero values), corresponds to an inactive layer, and rows of active layers have weights of 4 or more (i.e., at least 4 non-zero values), such that rows with weights 1, 2, or 3 (i.e., between 0 and 4 non-zero values) belong to the W matrix; and
- in the W matrix, rows of weights of 4 or more (i.e., more than 4 non-zero values) belong to the H matrix.

Figure 8:
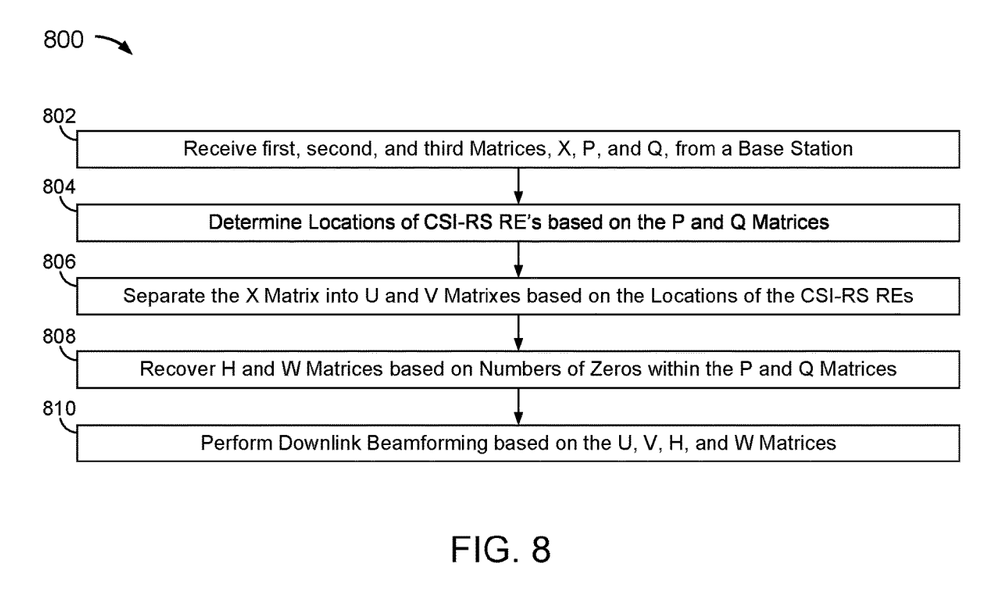
FIG. 8 is a flowchart of a method of recovering beamforming parameters, including determining locations of CSI-RS REs based on the P and Q matrices, extracting the U and V matrices from the X matrix based on the CSI-RS RE locations, recovering the H and W matrices from the P and Q matrices based on protocols of the H and W matrices and the CSI-RS RE locations, and performing beamforming based on the U, V, H, and W matrices, according to an embodiment.

FIG. 8 is a flowchart of a method 800 of recovering beamforming parameters, according to an embodiment.

At operation 802, RU 104A receives X matrix 702, P matrix 502, and Q matrix 504, from base station 102 over fronthaul link 118A. P matrix 502 contains shuffled weights A. Q matrix 504 includes shuffled weights B. X matrix 702=U matrix 704+V matrix 706.

At operation 804, downlink beamforming circuitry 218 determines locations of CSI-RS REs based on P matrix 502 and Q matrix 504.

At operation 806, downlink beamforming circuitry 218 separates X matrix 702 into U matrix 704 and V matrix 706 based on the locations of the CSI-RS REs determined at 804.

At operation 808, downlink beamforming circuitry 218 recovers H matrix 602 and W matrix 604 based on numbers of zeros within P matrix 502 and Q matrix 504.

At operation 810, downlink beamforming circuitry 218 performs downlink beamforming based on U matrix 704, H matrix 602, and W matrix 604. Downlink beamforming circuitry 218 may include vector processors that perform digital downlink beamforming in a vectorized format.

Figure 9:
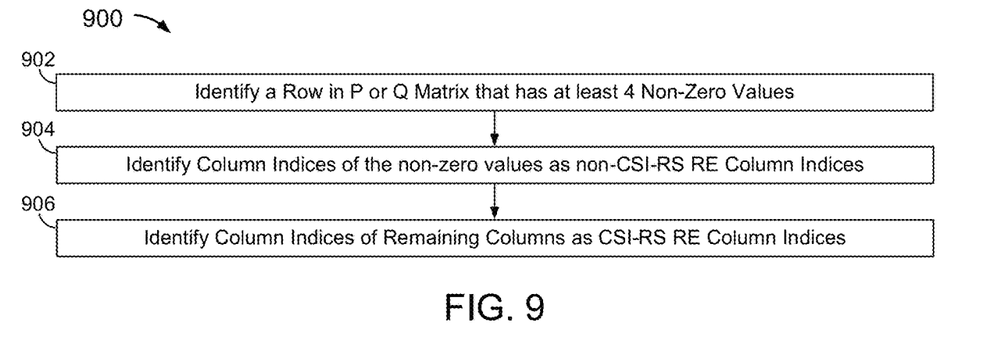
FIG. 9 is a flowchart of a method of determining locations of CSI-RS REs based on the P and Q matrices, according to an embodiment.

FIG. 9 is a flowchart of a method 900 of determining locations of CSI-RS REs based on P matrix 502 and Q matrix 504 (i.e., 804 of FIG. 8), according to an embodiment.

At operation 902, downlink beamforming circuitry 218 identifies a row in P matrix 502 or Q matrix 504 that has at least n non-zero values, where n is an integer that is based on features of CSI-RS REs and/or non-CSI-RS REs. In an embodiment, n=4. In FIG. 5, a first row 514 of Q matrix 504 includes 4 non-zero values.

At operation 904, downlink beamforming circuitry 218 identifies column indices 512 of the non-zero values (i.e., column indices 5, 6, 11, and 12), as column indices of non-CSI-RS REs.

At operation 906, downlink beamforming circuitry 218 identifies column indices 512 of remaining columns of the row identified at 902 (i.e., column indices 1, 2, 3, 4, 7, 9, 9, and 10), as column indices of CSI-RS REs.

Figure 10:
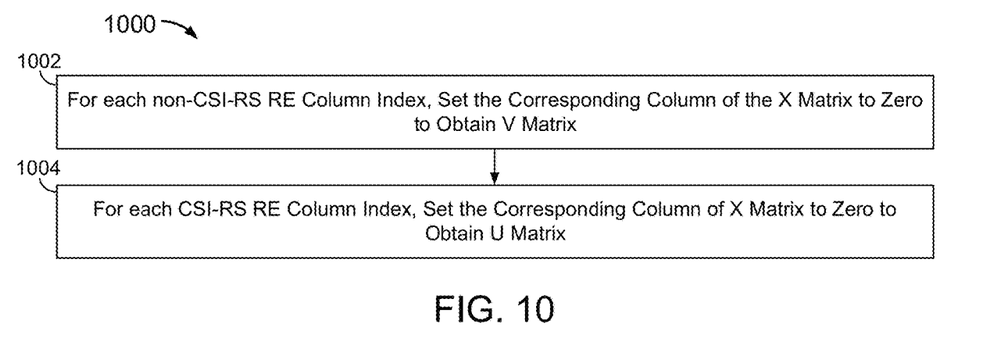
FIG. 10 is a flowchart of a method of separating the X matrix into the U and V matrices based the locations of the CSI-RS REs, according to an embodiment.

FIG. 10 is a flowchart of a method 1000 of separating X matrix 702 into U and V matrices 704 and 706 based the locations of the CSI-RS REs (i.e., 806 of FIG. 8), according to an embodiment.

At operation 1002, for each non-CSI-RS RE column index identified at 904, downlink beamforming circuitry 218 sets the corresponding column of X matrix 702 to zero to obtain V matrix 706.

At operation 1004, for each CSI-RS RE column index identified at 906, downlink beamforming circuitry 218 sets the corresponding column of X matrix 702 to zero to obtain U matrix 704.

Figure 11:
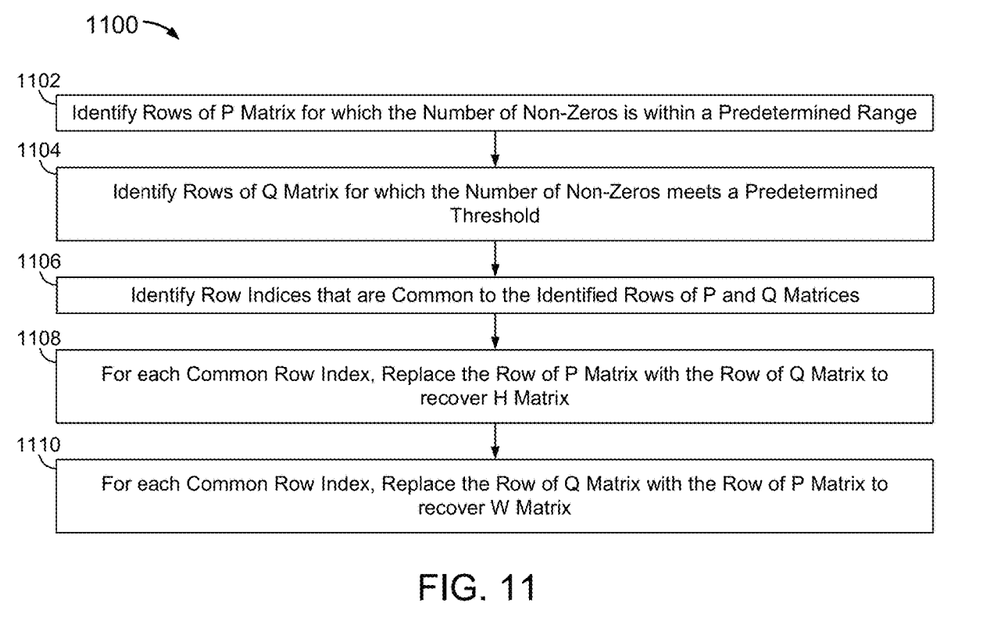
FIG. 11 is a flowchart of a method of recovering the H and W matrices from the P and Q matrices based on the protocols of the H and W matrices and the CSI-RS RE locations, according to an embodiment.

FIG. 11 is a flowchart of a method 1100 of recovering H and W matrices 602 and 604 based on numbers of zeros within P and Q matrices 502 and 504 (i.e., 808 of FIG. 8), according to an embodiment.

At operation 1102, downlink beamforming circuitry 218 identifies rows of P matrix 502 for which the number of non-zeros entries is within a predetermined range. The predetermined range may be based on features of CSI-RS REs and/or non-CSI-RS REs. In an embodiment, the predetermined range is between 0 and 4. In FIG. 5, each of rows 516, 518, 520, and 522 of P matrix 502 (row indices 1, 3, 5, and 7) includes 2 non-zero values within the predetermined range.

At operation 1104, downlink beamforming circuitry 218 identifies rows of Q matrix 504 for which the number of non-zeros values is at least n, wherein n is an integer as described above with respect to 902 in FIG. 9. In an embodiment, n=4. In FIG. 5, each of rows 514, 524, 526, and 528 of Q matrix 504 (row indices 1, 3, 5, and 7) includes at least 4 non-zero values.

At operation 1106, downlink beamforming circuitry 218 identifies row indices that are common to the identified rows of P and Q matrices 502 and 504. In the example of FIG. 5, common row indices are 1, 3, 5, and 7.

At operation 1108, for each common row index, downlink beamforming circuitry 218 replaces the corresponding row of P matrix 502 with the corresponding row of Q matrix 504 to recover H matrix 602. In FIG. 5, rows 516, 518, 520, and 522 of P matrix 502 are to be replaced with respective rows 514, 524, 526, and 528 of Q matrix 504, to recover H matrix 602. This effectively recovers H matrix 602 from the shuffled weights A within P matrix 502.

At operation 1110, for each common row index, downlink beamforming circuitry 218 replaces the corresponding row of Q matrix 504 with the corresponding row of P matrix 502 to recover W matrix 604. In FIG. 5, rows 514, 524, 526, and 528 of Q matrix 504 are to be replaced with respective rows 516, 518, 520, and 522 of P matrix 502, to recover W matrix 604. This effectively recovers W matrix 604 from the shuffled weights B within Q matrix 504.

In the example above, there are no null REs in P matrix 502 or Q matrix 504. As a result, the rows swapped between P matrix 502 and Q matrix 504 are identical.

Identification of CSI-RS REs in the presence of zero-power subcarriers is discussed below with reference to FIGS. 12 and 13.

Figure 12:
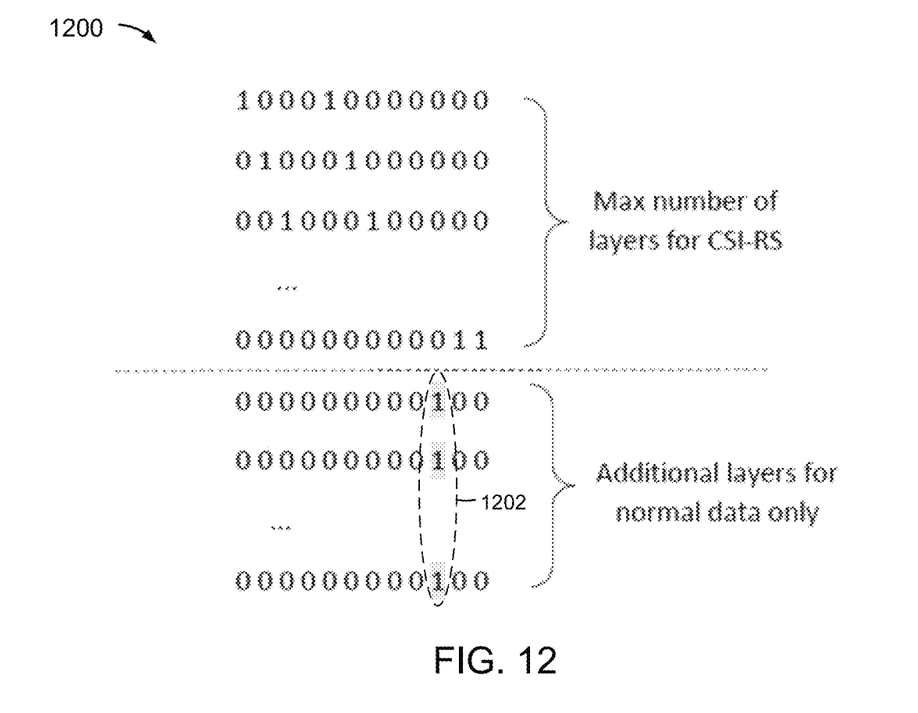
FIG. 12 illustrates a matrix, according to an embodiment.

FIG. 12 illustrates a matrix 1200, according to an embodiment.

Figure 13:
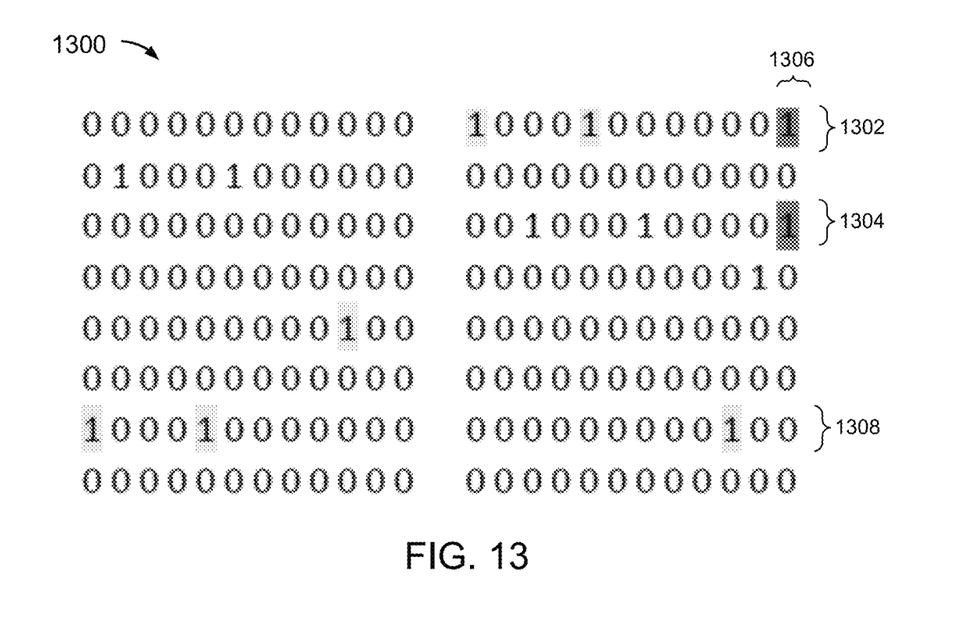
FIG. 13 illustrates another matrix, according to an embodiment.

FIG. 13 illustrates a matrix 1300, according to an embodiment.

When zero-power and non-zero-power CSI-RS subcarriers coexist in a single resource block (RB), there may not be any rows in the mask matrices with weights equal to or larger than 4. In this situation, the mask matrices should be very sparse, and techniques presented below may be applied.

When the number of layers for data is more than that of CSI-RS, the ones in the rows for normal data only indicate the locations of non CSI-RS subcarriers. In FIG. 12, this is illustrated at 1202.

When the additional layers are all zero, the mask matrix should be extremely sparse. In an embodiment, all of the columns of the matrix P with non-zero elements are all zero in matrix Q. In this situation, downlink beamforming circuitry 218 may identify all the columns containing a non-zero value in the mask matrix Q as CSI-RS subcarriers.

In an embodiment, some columns contain ones in both mask matrices, which may be a result of row swaps. Such a conflict may be resolved as described below.

First, downlink beamforming circuitry 218 identifies the conflicting columns. The rows to be swapped will be limited to those with non-zero values in the conflicting columns. For example, in FIG. 13, columns 1, 5 and 10 are conflicting, and rows 1, 5 and 7 are candidates to be swapped.

Candidate rows that have ones in the same columns as at least one non-candidate row should not be swapped. For example, in FIG. 13, rows 1302 and 1304 have 1s in column 1306, so row 1302 may be identified as fixed. For rows identified as fixed, rows that contain conflicting is with the fixed rows are to be swapped. In the example of FIG. 13, row 1308 is to be swapped.

If no fixed rows are identified, then the row with maximum number of conflicting 1s is to be swapped.

Downlink beamforming circuitry 218 may look for other conflicting columns, as described above. In the example of FIG. 13, after row 1308 is swapped, no other conflicts exist.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An apparatus, comprising:
 a radio unit comprising digital downlink beamforming circuitry configured to:
  receive a payload matrix, first and second bit mask matrices, and a resource grid from a base station, wherein the resource grid comprises a block of baseband resource elements (REs), and wherein the baseband REs comprise channel state information reference signal REs (CSI-RS REs) and non-CSI-RS REs;
  determine column indices of the non-CSI-RS REs and the CSI-RS REs within the block based on entries of one of the first and second bit mask matrices;
  recover a non-CSI-RS RE payload matrix and a CSI-RS RE payload matrix from the payload matrix based on the column indices of the non-CSI-RS REs and the CSI-RS REs within the block;
  recover CSI-RS RE beamforming matrix and a non-CSI-RS RE beamforming matrix from the first and second bit mask matrices and the payload matrix based on entries of the first and second bit mask matrices; and
  perform digital downlink beamforming based on the CSI-RS RE payload matrix, the non-CSI-RS RE payload matrix, the CSI-RS RE beamforming matrix, and the non-CSI-RS RE beamforming matrix.

2. The apparatus of claim 1, wherein the digital downlink beamforming circuitry is further configured to:
 determine the column indices of the non-CSI-RS REs and the CSI-RS REs within the block based on non-zero entries of one of the first and second bit mask matrices.

3. The apparatus of claim 2, wherein the digital downlink beamforming circuitry is further configured to determine the column indices of the non CSI-RS REs and the CSI-RS REs within the block by:
 identifying a row in the first or second bit mask matrix that has at least n non-zero entries, wherein n is an integer;
 identifying column indices of the non-zero entries of the identified row as the column indices of the non-CSI-RS REs within the block; and
 identifying column indices of remaining columns of the identified row as the column indices of the CSI-RS REs within the block.

4. The apparatus of claim 3, wherein n equals 4.

5. The apparatus of claim 3, wherein the digital downlink beamforming circuitry is further configured to recover the non-CSI-RS RE payload matrix and the CSI-RS RE payload matrix by:
 for the non-CSI-RS RE column indices, setting the corresponding columns of the payload matrix to zero to recover the CSI-RS RE payload matrix; and
 for the CSI-RS RE column indices, setting the corresponding columns of the payload matrix to zero to recover the non-CSI-RS RE payload matrix.

6. The apparatus of claim 1, wherein the digital downlink beamforming circuitry is further configured to recover the CSI-RS RE beamforming matrix and the non-CSI-RS RE beamforming matrix by:
 identifying row indices for rows of the first bit mask matrix for which a number of non-zero entries is within a predetermined range;
 identifying row indices for rows of the second bit mask matrix that have at least n non-zero entries, wherein n is an integer;
 determining row indices that are common to the identified row indices of the first and second bit mask matrices;
 for the common row indices, replacing the corresponding row of the first bit mask matrix with the corresponding row of second bit mask matrix to recover the CSI-RS RE beamforming weight matrix; and for the common row indices, replacing the corresponding row of the second bit mask matrix with the corresponding row of the first bit mask matrix to recover the non-CSI-RS RE beamforming weight matrix.

7. The apparatus of claim 6, wherein the predetermined range is 0-4, and wherein n equals 4.

8. The apparatus of claim 1, wherein the digital downlink beamforming circuitry is further configured to perform the digital downlink beamforming by:
  computing {H, W}·{U; V}, in a vectorized process, wherein,
  H is the non-CSI-RS RE beamforming weight matrix,
  W is the CSI-RS RE beamforming weight,
  U is the non-CSI-RS RE payload matrix,
  V is the CSI-RS RE payload matrix,
  {,} represents matrix horizontal concatenation, and
  {;} represents matrix vertical concatenation.

9. A radio unit (RU), comprising:
  baseband processing circuitry configured to generate a baseband signal based on data received from a base station;
  modulation circuitry configured to modulate carriers based on the digital baseband signal;
  radio frequency front end circuitry configured to frequency up-convert the modulated carriers; and
  an antenna subsystem configured to transmit the frequency up-converted modulated carriers;
  wherein the baseband processing circuitry includes digital downlink beamforming circuitry configured to,
    receive a payload matrix, first and second bit mask matrices, and a resource grid from the base station, wherein the resource grid comprises a block of baseband resource elements (REs), and wherein the baseband REs comprise channel state information reference signal REs (CSI-RS REs) and non-CSI-RS REs;
    determine column indices of the non-CSI_RS REs and the CSI-RS REs within the block based on entries of one of the first and second bit mask matrices;
    recover a non-CSI-RS-RE payload matrix and a CSI-RS RE payload matrix from the payload matrix based on the column indices of the non-CSI-RS REs and the CSI-RS REs within the block;
    recover a CSI-RS RE beamforming matrix and a non-SCI-RS RS RE beamforming matrix from the first and second bit mask matrices and the payload matrix based on entries of the first and second bit mask matrices; and
    perform digital downlink beamforming based on the CSI-RS RE payload matrix, the non-CSI-RS RE payload matrix, the CSI-RS RE beamforming matrix, and the non-CSI-RS RE beamforming matrix.

10. The RU of claim 9, wherein the digital downlink beamforming circuitry is further configured to:
  determine the column indices of the non-CSI-RS REs and the CSI-RS REs within the block based on non-zero entries of one of the first and second bit mask matrices.

11. The RU of claim 10, wherein the digital downlink beamforming circuitry is further configured to determine the column indices of the non-CSI-RS REs and the CSI-RS REs within the block by:
  identifying a row in the first or second bit mask matrix that has at least n non-zero entries, wherein n is an integer;
  identifying column indices of the non-zero entries of the identified row as the column indices of the non-CSI-RS REs within the block; and
  identifying column indices of remaining columns of the identified row as the column indices of the CSI-RS REs column indices within the block.

12. The RU of claim 11, wherein n equals 4.

13. The RU of claim 11, wherein the digital downlink beamforming circuitry is further configured to recover the non-CSI-RS RE payload matrix and the CSI-RS RE payload matrix by:
  for the non-CSI-RS RE column indices, setting the corresponding column of the payload matrix to zero to recover the CSI-RS RE payload matrix; and
  for the CSI-RS RE column indices, setting the corresponding column of the payload matrix to zero to recover the non-CSI-RS RE payload matrix.

14. The RU of claim 9, wherein the digital downlink beamforming circuitry is further configured to recover the CSI-RS RE beamforming matrix and the non-CSI-RS RE beamforming matrix by:
  identifying row indices for rows of the first bit mask matrix for which a number of non-zero entries is within a predetermined range;
  identifying row indices for rows of the second bit mask matrix that have at least n non-zero entries, wherein n is an integer;
  determining row indices that are common to the identified row indices of the first and second bit mask matrices;
  for the common row indices, replacing the corresponding row of the first bit mask matrix with the corresponding row of the second bit mask matrix to recover the CSI-RS beamforming weight matrix; and
  for the common row indices, replacing the corresponding row of the second bit mask matrix with the corresponding row of the first bit mask matrix to recover the non-CSI-RS beamforming weight matrix.

15. A method, comprising, at a radio unit (RU) of a radio access network:
  receiving a payload matrix, first and second bit mask matrices, and a resource grid from a base station, wherein the resource grid comprises a block of baseband resource elements (REs), and wherein the baseband REs comprise channel state information reference signal resource elements (CSI-RS REs) and non-CSI-RS REs;
  determining column indices of the non-CSI-RS REs and the CSI-RS REs within the block based on entries of one of the first and second bit mask matrices;
  recovering a non-CSI-RS RE payload matrix and a CSI-RS RE payload matrix from the payload matrix based on the column indices of the non-CSI-RS REs and the CSI-RS REs within the block;
  recovering a CSI-RS RE beamforming matrix and a non-CSI-RS RE beamforming matrix from the first and second bit mask matrices and the payload matrix based on entries of the first and second bit mask matrices; and
  performing digital downlink beamforming based on the CSI-RS RE payload matrix, the non-CSI-RS RE payload matrix, the CSI-RS RE beamforming matrix, and the non-CSI_RS RE beamforming matrix.

16. The method of claim 15, wherein the recovering a non-CSI-RS RE payload matrix and a CSI-RS RE payload matrix comprises:
  determining the column indices of the non-CSI-RS REs and the CSI-RS REs within the block based on non-zero entries of one of the first and second bit mask matrices.

17. The method of claim 16, wherein the determining the column indices of the CSI-RS REs and the CSI-RS REs within the block comprises:
- identifying a row in the first or second bit mask matrix that has at least n non-zero entries, wherein n is an integer;
- identifying column indices of the non-zero entries of the identified row as the column indices of the non-CSI-RS REs within the block; and
- identifying column indices of remaining columns of the identified row as the column indices of the CSI-RS REs within the block.

18. The method of claim 16, wherein the recovering a non-CSI-RS RE payload matrix and a CSI-RS RE payload matrix comprises:
- for the non-CSI-RS RE column indices, setting the corresponding column of the payload matrix to zero to recover the CSI-RS RE payload matrix; and
- for the CSI-RS RE column indices, setting the corresponding column of the payload matrix to zero to recover the non-CSI-RS RE payload matrix.

19. The method of claim 15, wherein the recovering a CSI-RS RE beamforming matrix and a non-CSI-RS RE beamforming matrix comprises:
- identifying row indices for rows of the first bit mask matrix for which a number of non-zero entries is within a predetermined range;
- identifying row indices for rows of the second bit mask matrix that have at least n non-zero entries, wherein n is an integer;
- determining row indices that are common to the identified row indices of the first and second bit mask matrices;
- for the common row indices, replacing the corresponding row of the first bit mask matrix with the corresponding row of the second bit mask matrix to recover the CSI-RS beamforming weight matrix; and
- for the common row indices, replacing the corresponding row of the second bit mask matrix with the corresponding row of the first bit mask matrix to recover the non-CSI-RS beamforming weight matrix.

20. The method of claim 19, wherein the predetermined range is 0-4, and wherein n equals 4.

* * * * *